Patented Nov. 9, 1926.

UNITED STATES PATENT OFFICE.

1,606,512

CHARLES H. CASPAR, OF PHILADELPHIA, PENNSYLVANIA.

PROCESS OF PREPARING AN ICE-CREAM MIX.

No Drawing.   Application filed October 8, 1921.   Serial No. 506,356.

In the commercial manufacture of ice cream it is customary to prepare a mixture of several ingredients, which is commonly known as the "mix", which is then ordinarily treated to a pasteurizing step and thereafter thoroughly agitated so as to substantially produce an emulsion. The composition is next cooled and allowed to ripen or age for a suitable period, the flavoring substance is then added and the composition frozen in any suitable way and subsequently hardened prior to being placed on the market. The composition of the mix varies considerably, each manufacturer ordinarily having his own preferred formula to produce a given grade or quality of ice cream, but under any conditions the mix ordinarily contains milk, cream and condensed milk, which may be generally classed as lactic elements, sugar, gelatin and water in suitable proportions.

A principal object of my invention is to provide an improved composition of matter suitable for use as a "mix" in the manufacture of ice cream and which in addition to the ingredients ordinarily utilized, shall embody a suitable quantity of yeast preferably of a type high in vitamines whereby the important food value of the yeast and beneficial effect of the vitamines will be imparted to the finished ice cream. A further object of my invention is to effect under certain conditions the generation of carbon dioxide gas in the mix by fermentation or partial fermentation through the admixture of a certain amount of yeast with the other ingredients of the mix, whereby the finished ice cream is improved in quality and rendered more readily marketable than ice cream manufactured from the mixes heretofore in use and which depends on the introduction of air or gas from external sources to effect increase in volume, which increase, in my improved mix, is caused by the generation of carbon dioxide within the mix as aforesaid. Additionally, the yeast itself, apart from its contained vitamines, improves and enhances the food value of the ice cream manufactured from the mix wherein it is contained.

My invention further comprehends all of the other objects and novel features hereinafter more specifically disclosed.

As hitherto stated, the ordinary mix or composition from which commercial ice cream is manufactured varies considerably with regard to its ingredients and the proportions thereof in accordance with the formulas employed by different manufacturers, and in carrying out my invention any of these several formulas may be employed with equally good results. As typical of the ordinary mix and as exemplifying one from which good results may be obtained in practice, a given quantity or batch of the mix may be assumed to contain 320 pounds of cream, 320 pounds of milk, 150 pounds of sugar, 200 pounds of condensed milk, 4 pounds of gelatin and 17 pounds of water, these ingredients being first mixed together and then pasteurized at a suitable temperature, such as 140° F., in the ordinary way, after which the batch is treated by a so-called homogenizing machine by which the several ingredients are thoroughly mixed together and substantially emulsified. The batch is then customarily reduced to a relatively low temperature, say 40° F., and allowed to age or ripen in suitable vats for a period varying from 12 to 48 hours, after which the flavor may be added preparatory to freezing.

In carrying out my invention, at some suitable point, conveniently after the emulsification of the batch, I add thereto a suitable quantity of yeast, preferably of a type high in vitamines, the exact quantity depending on the composition or type of yeast as well as the results desired. I preferably employ a sufficient quantity of the yeast and admix it with the other ingredients in such manner and at such a time as to effect a fermentation or partial fermentation of the batch so as to cause a desirable amount of carbon dioxide to be generated prior to the freezing operation, and I have found that for this purpose good results may be obtained when one pound of yeast is added to 200 pounds of the mix, say at the time of the aging or ripening of the latter in the vat. By continuing the latter operation for a period of approximately 36 hours sufficient time is given to the yeast to propagate within the mixture and thereby increase itself by a material amount, sometimes as much as 15%, depending chiefly upon the temperature used, and at the same time by reason of the fermentation caused in the mix, a considerable quantity of carbon dioxide gas is generated and retained in the mix to be used for swelling or increasing the volume of the mix. The flavoring may now be added or at some earlier point in the process if desired, and the mixture frozen in the ordinary way, the contained carbonic acid gas serving to render the finished product light, fluffy and readily salable.

It will of course be understood that when the yeast is employed in the manner aforesaid, the food value of the yeast itself as well as the beneficial qualities of the vitamines contained therein remain in the finished ice cream thereby materially adding to its value as a food, and under certain conditions it may be desirable to utilize the yeast in such manner as to produce these results alone without the fermentation of the mix or generation of an appraciable amount of carbonic acid gas therein. Under these circumstances I prefer to add the yeast at a relatively short time, for example one hour or less, before the batch is transferred from the vats to the freezers, under which conditions owing to the relatively low temperature, for example 40° F., at which the batch is maintained, but little propagation of the yeast will take place and substantially no fermentation be effected, so that while the finished product will contain the food value of the yeast as well as its vitamine elements, the generation of carbonic acid gas through fermentation will be absent.

It will be understood that in preparing my improved composition of matter the ingredients may be considerably varied from those herein given by way of example only, and that the quantity of yeast utilized will be largely dependent on the particular type of yeast employed as well as the results desired, and I therefore do not in any way desire or intend to limit or confine myself to any specific proportions or ingredients nor to any precise manner of preparing the composition, as the same may be mixed in different ways and the yeast added at any suitable time without departing from the spirit and scope of the invention as defined in the appended claim.

Having thus described my invention, I claim and desire to protect by Letters Patent of the United States:

The process of preparing an ice cream mix which consists in admixing together a lactic material, sugar and gelatin, and then adding yeast and permitting the mixture to stand for a sufficient time to allow the yeast to effect fermentation and the generation of carbonic acid gas within the mixture.

In witness whereof, I have hereunto set my hand this 7th day of October, 1921.

CHARLES H. CASPAR.